United States Patent
Wu et al.

(10) Patent No.: US 8,706,756 B2
(45) Date of Patent: Apr. 22, 2014

(54) METHOD, SYSTEM AND APPARATUS OF HYBRID FEDERATED SEARCH

(75) Inventors: Zhiguo Wu, Sunnyvale, CA (US); Zonghuan Wu, Cupertino, CA (US); George Vanecek, Jr., Madison, WI (US)

(73) Assignee: Futurewei Technologies, Inc., Plano, TX (US)

( * ) Notice: Subject to any disclaimer, the term of this patent is extended or adjusted under 35 U.S.C. 154(b) by 82 days.

(21) Appl. No.: 13/105,314

(22) Filed: May 11, 2011

(65) Prior Publication Data

US 2012/0290555 A1   Nov. 15, 2012

(51) Int. Cl.
*G06F 17/30* (2006.01)
(52) U.S. Cl.
USPC .......................................................... 707/770
(58) Field of Classification Search
USPC .......................................................... 707/770
See application file for complete search history.

(56) References Cited

U.S. PATENT DOCUMENTS

| | | |
|---|---|---|
| 2002/0161753 A1 | 10/2002 | Inaba et al. |
| 2003/0212673 A1* | 11/2003 | Kadayam et al. ................. 707/3 |
| 2004/0088174 A1* | 5/2004 | Agrawal et al. ................... 705/1 |
| 2005/0004898 A1* | 1/2005 | Bluhm ............................... 707/3 |
| 2005/0149496 A1* | 7/2005 | Mukherjee et al. ............... 707/3 |
| 2008/0114731 A1 | 5/2008 | Kumar |
| 2009/0006332 A1 | 1/2009 | Mowatt et al. |
| 2011/0153586 A1 | 6/2011 | Wang et al. |

FOREIGN PATENT DOCUMENTS

| | | |
|---|---|---|
| CN | 1499402 A | 5/2004 |
| CN | 1839385 A | 9/2006 |
| CN | 101667179 A | 3/2010 |
| WO | 2004097685 A2 | 11/2004 |

OTHER PUBLICATIONS

Govaerts et al., a Federated Search and Social Recommendation Widget, Mar. 2011.*
Paddock et al., Windows 7 Federated Search Provider Implementer's Guide, Feb 2009.*
Foreign Communication From a Related Counterpart Application, PCT Application PCT/CN2011/074210, International Search Report dated Dec. 22, 2011, 4 pages.
Foreign Communication From a Related Counterpart Application, PCT Application PCT/CN2011/074210, Written Opinion dated Dec. 22, 2011, 10 pages.

* cited by examiner

*Primary Examiner* — William Spieler
(74) *Attorney, Agent, or Firm* — Conley Rose, P.C.; Grant Rodolph; Ryan L. Lobato (57) ABSTRACT

A client device comprising a search module configured to receive a search instruction from a federated search server, query one or more search services based on the search instruction, receive a first search result that comprises one or more search results from one or more search services, send the first search result to the federated search server, and receive a second search result from the federated search server. Also disclosed is a federated search server comprising a search instruction generator configured to send a search instruction to a client device, and a search result consolidator configured to receive a first search result from the client device, wherein the first search result comprises one or more search results and is obtained by the client device from one or more search services.

32 Claims, 7 Drawing Sheets

METHOD, SYSTEM AND APPARATUS OF HYBRID FEDERATED SEARCH

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A search engine returns results that match a search query submitted by a user. General search engines, such as Google, are Crawler-based, as they "crawl" the web to collect information, "index" the information, and allow users to query the index to search through the information. Users often need to find and access information in various content repositories, such as line of knowledge bases, social networks, online news, online video, online music, web search engines, etc. In many situations, a single general search engine may not meet the users' individual requirements to retrieve information in many situations, such as due to lack of access to some content repositories. A federated search engine searches on multiple content repositories and/or information sources. It resolves the deficiency of one search engine and provides a mechanism that allows users to get information gathered from multiple sources. It usually dispatch the users' queries to the underlying content repositories/information sources, utilize their native search function to return results, and then gather and process these results to return to the users. Such a mechanism also eliminates the necessity for information crawling and indexing.

SUMMARY

In one embodiment, the disclosure includes a client device comprising a search module configured to receive a search instruction from a federated search server, query one or more search services based on the search instruction, receive a first search result that comprises one or more search results from one or more search services, send the first search result to the federated search server, and receive a second search result from the federated search server.

In another embodiment, the disclosure includes a federated search server comprising a search instruction generator configured to send a search instruction to a client device, and a search result consolidator configured to receive a first search result from the client device, wherein the first search result comprises one or more search results and is obtained by the client device from one or more search services.

In another embodiment, the disclosure includes an apparatus comprising a federated search server that is configured to communicate with one or more search services, send a search instruction to a client device, receive a first search result from the client device, process the first search result to generate a second search result, and send the second search result to the client device, wherein the first search result comprises one or more search results and is obtained by the client device from one or more search services.

In yet another embodiment, the disclosure includes a method comprising receiving a search instruction from a federated search server, querying one or more search services based on the search instruction, receiving a first search result including one or more search results from one or more search service, sending the first search result to the federated search server, and receiving a second search result from the federated search server.

In yet another embodiment, the disclosure includes a method comprising sending a search instruction to a client device, receiving a first search result from the client device, processing the first search result to generate a second search result, and sending the second search result to the client device, wherein the first search result comprises one or more search results and is obtained by the client device from one or more search services.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method, apparatus, and system for providing a hybrid federated search. The hybrid federated search may extend the typical federated search by implementing searches on both a server side and a client side instead of the server side only. The hybrid federated search may leverage the computing power of client devices, such as a personal computer (PC), a smart phone, or other client devices, and the connectivity of such devices to handle at least part of the search operation. Instead of allocating the search operation entirely to a central federated search server, the hybrid federated search may implement at least part of the data acquisition, management, and analysis process onto the client device. The client device may conduct, in cooperation with the central federated search server, a part of the search processing and/or may handle querying search services entirely instead of the federate search server.

Compared with traditional and current federated search schemes, the hybrid federated search scheme may reduce search requirements on the server or network side, e.g., reduce network resources, reduce computing requirements on the federated search server, and hence reduce cost. The hybrid federated search may also distribute network traffic more evenly over the different entities and connections, which may prevent bottlenecks at the federated search server. In the hybrid federated search scheme, a plurality of search services may receive one or more queries from a trusted client device rather than a third party service, e.g., the federated search server. This may resolve some security and trust issues that may prevent the third party from accessing the search services and thus cause failed or inefficient searches.

Figure 1:
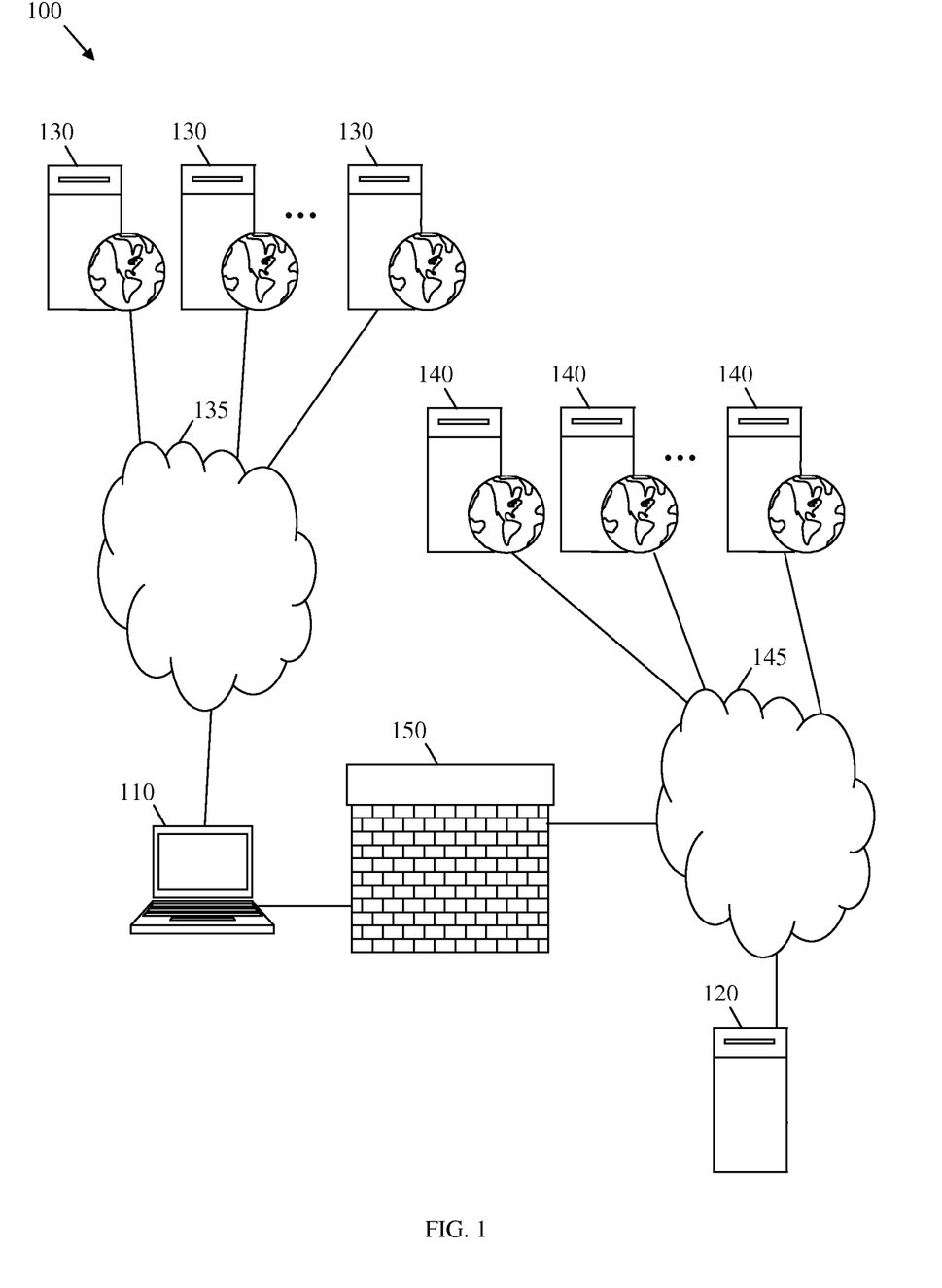
FIG. 1 is a schematic diagram of an embodiment of a hybrid federated search system.

FIG. 1 illustrates an embodiment of a hybrid federated search system 100. The hybrid federated search system 100 may comprise a client device 110, a federated search server 120, a plurality of first search services 130, a first network 135, a plurality of second search services 140, a second network 145, and a firewall 150 positioned between the client device 110 and the federated search server 120. The first search services 130 may be coupled to the client device 110 via the first network 135. The second search services 140 may be coupled to the federated search server 120 and to the client device 110 via the second network 145. The client device 110 may also be coupled to the federated search server 120 via the second network 145. The components of the hybrid federated search system 100 may be arranged as shown in FIG. 1.

The client device 110 may be any device configured to allow a user to connect to a network, such as an Internet Protocol (IP) network, for example the Internet, and deliver content or data to the user. For instance, the client device 110 may be a fixed or mobile user-oriented device, such as a desktop computer, a notebook or laptop computer, a netbook computer, a tablet computer, a smart phone, a personal digital assistant (PDA), or a cellular telephone.

The federated search server 120 may be any device or component configured to provide federated search functions to a user using the client device 110. For instance, the federated search server 120 may receive a search request or query from the client device 110, communicate with the second search services 140 to perform an aggregated search, and return search results to the client device 110. The federated search server 120 may also store some of the results to provide faster responses to future queries that may be similar. The federated search server 120 may communicate queries and results with the client device 110 and the second search services 140 via the second network 145.

Specifically, the federated search server 120 may transform and send the queries from the client device 110 to any or all of the second search services 140, receive search results from the second search services 140, consolidate the search result record, and send the consolidated result to the client device 110. Additionally, after receiving queries from the client device 110, the federated search server 120 may generate and send search instructions to the client device 110. The search instructions may cause the client device 110 to initiate search requests or queries with at least one of the first search services 130 via the first network 135, at least one of the second search services 140 via the second network 145, or both. Subsequently, the client device 110 may process and send the search result records from the first search services 130 and/or the second search services 140 to the federated search server 120 with other possible search results directly retrieved by the federated search server 120 for consolidation at the federated search server 120. The federated search server 120 may then send one or more consolidated search results from at least one of the first search services 130, at least one of the second search services 140, or both to the client device 110, which may not require further processing at the client device 110, and/or return a plurality of raw search results, which may require further processing at the client device 110, to the client device 110. The raw search results may comprise search results that have not been processed by the federated search server.

The search instructions sent from the federated search server 120 to the client device 110 may be generated using a plurality of pre-customized script, description, configuration and/or other metadata of search services that may be stored at the federated search server 120. The pre-customized script, description, configuration and/or other metadata may comprise profile information of search services, which may describe the connections, interfaces, and/or result wrappers of the search services. The search instructions may indicate to the client device 110 which of the first search services 130 and/or the second search services 140 the client device 110 may send queries to. The search instructions may comprise executable program codes for communicating with corresponding first search services 130 and/or second search services 140, and the federated search server 120. The search instructions may be further configured to instruct the client device 110 on how to process search results retrieved from the first search services 130 and/or the second search services 140.

The first search services 130 and the second search services 140 may be any devices or components configured to perform searches based on received search requests or queries and return search results. The first search services 130 and the second search services 140 may comprise underlying search engines and/or databases that perform searches and communicate queries and search results with users via web interfaces, web services, and/or APIs. Specifically, the first search services 130 may communicate queries and results with the client device 110 via the first network 135, and the second search services 140 may communicate queries and results with the client device 110 via the second network 145. For instance, the first network 135 may be an Intranet or any other network, such as a Local Area Network (LAN), and the second network 145 may be the Internet or any other network, such as a Metropolitan Area Network (MAN). The client device 110 may connect to the first network 135 and similarly the second network 145 via a wireless link (e.g., cellular or wireless broadband link), a physical link (e.g., electrical or optical connection), or both.

The communications between the client device 110 and the federated search server 120 may be protected or restricted by the firewall 150. The firewall 150 may be any component or device configured to limit or block some incoming communications from the second network 145 to the client device 110 that may not be authorized or authenticated and/or may harm the client device 110. The firewall 150 may be implemented using software, hardware, or both. The firewall 150 may also restrict the federated search server 120 from communicating with the first search services 130, for example in an attempt to perform an aggregated search.

Further, the first search services 130 may only provide services to individual users and client devices but not to federated search servers. For example, a first search service 130 may require the user's subscription to provide search results, which may be provided by submitting search queries only from individual users or client devices but not from federated search servers. As such, to retrieve and consolidate results from the first search services 130 and/or the second search services 140, the federated search server 120 may overcome the access restrictions imposed by the first access services 130 and the firewall 150 by providing the client device 110 with search instructions on how to query the first search services 130. By sending the instructions to the client device 110, the federated search server 120 may offload the process of querying the first search services 130 to the client device 110. Offloading the query of first search services 130 to the client device 110 may also reduce the work load on the federated search server 120, reduce the traffic handled by the federated search server 120, reduce usage of the federated search server's system resources, or combinations thereof. In the hybrid federated search system 100, the client device may perform a portion of the federated search on behalf of the federated search server. The federated search server may also directly query and receive results from other search services, and consolidate the results received from the other search services with the results forwarded from the client device.

Figure 2:
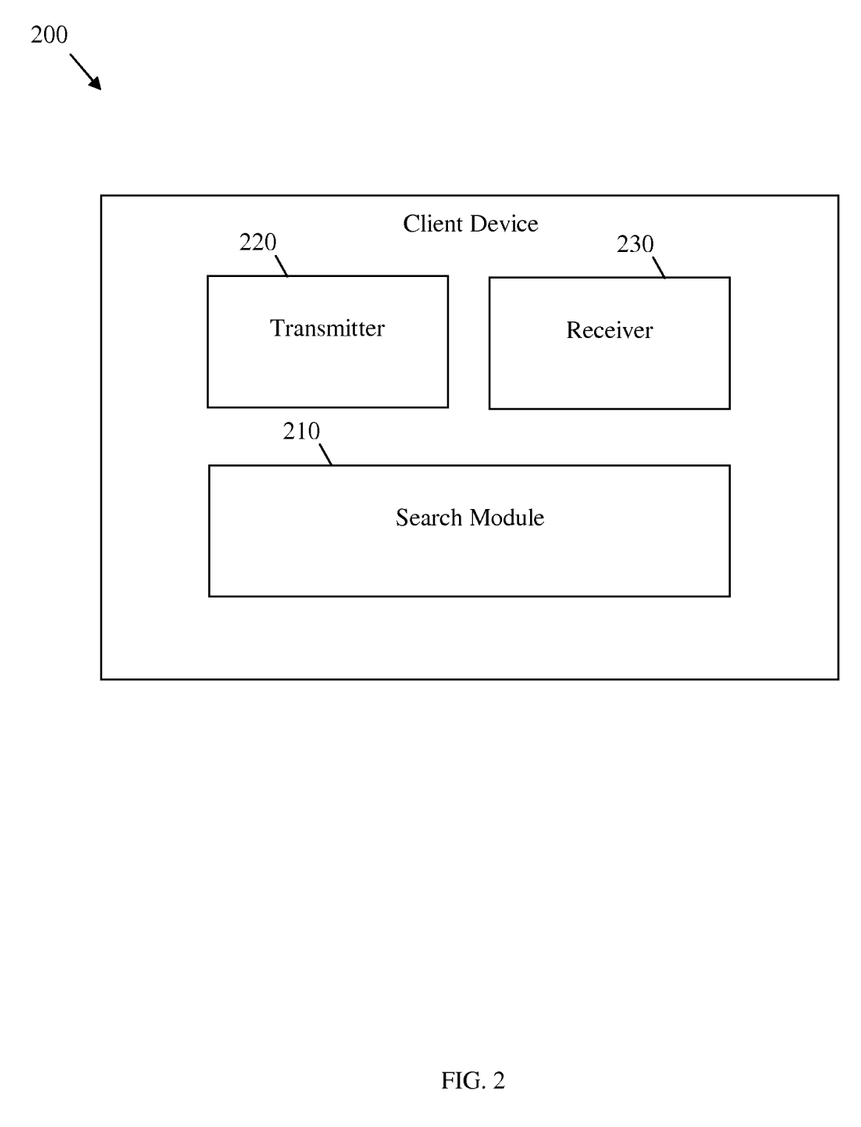
FIG. 2 is a schematic diagram of an embodiment of a client device.

FIG. 2 illustrates an embodiment of a client device 200. The client device 200 may communicate with a federated search server, such as the federated search server 120, and perform a portion of the federated search. Accordingly, the client device 200 may send queries to a plurality of search services based on search instructions from the federated search server and may process and/or send the search results from the search services to the federated search server for consolidation.

The client device 200 may comprise a search module 210, a transmitter 220, and a receiver 230. The search module 210 may request a search query, process a search result, send the search result, and/or present search result according to instructions from federated search server. The search module 210 may be coupled to the transmitter 220 and the receiver 230. The search module 210 may communicate with one or more search services and the federated search server through the transmitter 220 and the receiver 230 via a first network (e.g., the Intranet) and with the search services via a second network (e.g., an Internet) according to search instructions. The search module 210 may access a remote search service, e.g., via the Internet. The transmitter 220 may be configured to send, e.g., via one or more egress ports, packets, objects, or Type-Length-Values (TLVs) to other network components. The receiver 230 may be configured to receive, e.g., via one or more ingress ports, packets, objects, or TLVs from other network components. The transmitter 220 and the receiver 230 may also comprise or may be coupled to logic circuitry (not shown) to determine which network components to send/receive the packets to/from. The network components may comprise a federated search server and one or more search services, and the transmitted/received traffic may comprise search queries, search results, and search instructions.

The receiver 230 may also receive notification information from the federated search server. The search module 210 may also react based on the notification messages. For example, the search module 210 may instruct the interface update to display the progress information contained in the notification message.

Figure 3:
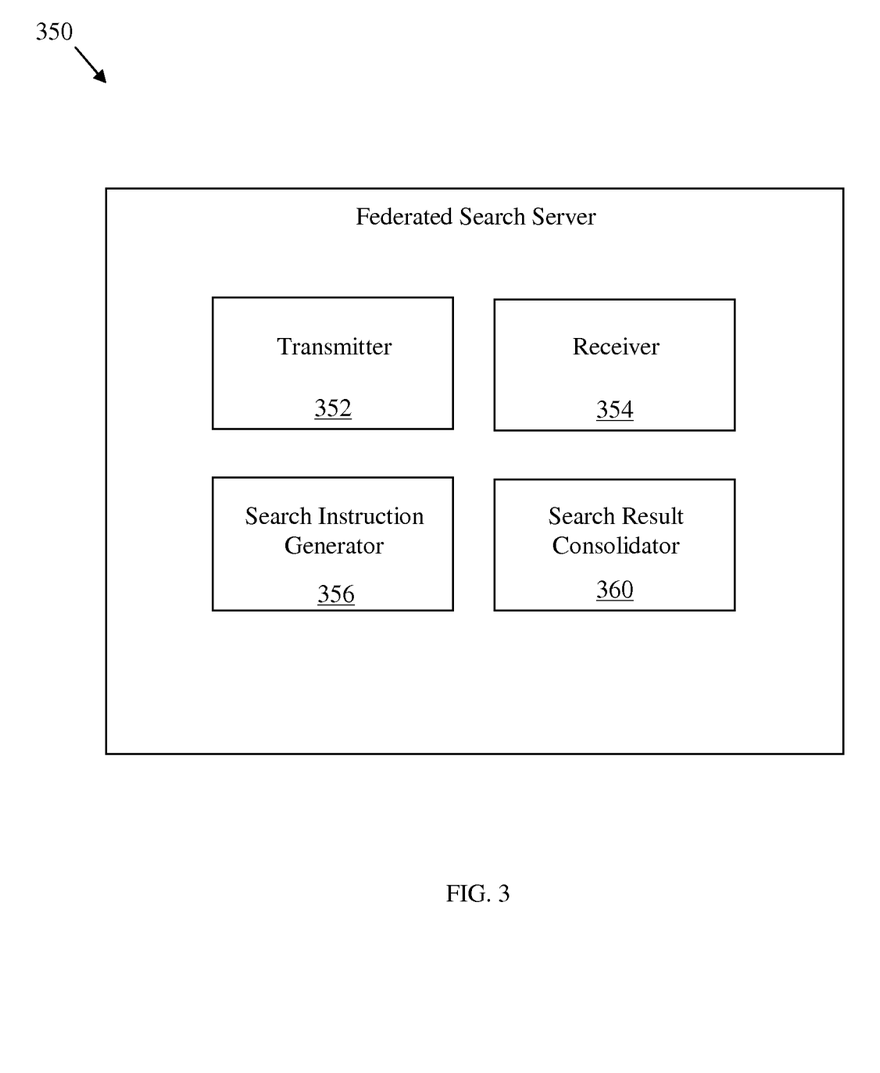
FIG. 3 is a schematic diagram of an embodiment of a federated search server.

FIG. 3 illustrates an embodiment of a federated search server 350, which may correspond to the federated search server 120. The federated search server 450 may comprise a transmitter 352, a receiver 354, a search instruction generator 356, and a search result consolidator 360. The transmitter 352 may be configured to send, e.g., via one or more egress ports, packets, objects, or Type-Length-Values (TLVs) to other network components. The receivers 354 may be configured to receive, e.g., via one or more ingress ports, packets, objects, or TLVs from other network components. The transmitter 352 and the receiver 354 may also comprise or may be coupled to logic circuitry (not shown) to determine which network components to send/receive the packets to/from. The network components may comprise a client device and one or more search services, and the transmitted/received traffic may comprise search queries, search results, and search instructions.

The search instruction generator 356 may be configured to receive queries from a client device 110 via the receiver 354. The search instruction generator 356 may be configured to generate corresponding search instruction for the client device 110 based on pre-customized configuration and metadata, according to search query from the client device 110. The generated search instructions by the search instruction generator 456 may be sent to client device 110 by the transmitter 352. The search result consolidator 360 may be configured to receive search results from one or more second search services directly and one or more first search services via the client device 110, consolidate the search results, and send a consolidated search result to the client device 110.

Each component, including search instruction generator 356, the search result consolidator 360, the receiver 354, transmitter 352, may also generate notification messages and send to the client device 110.

Figure 4:
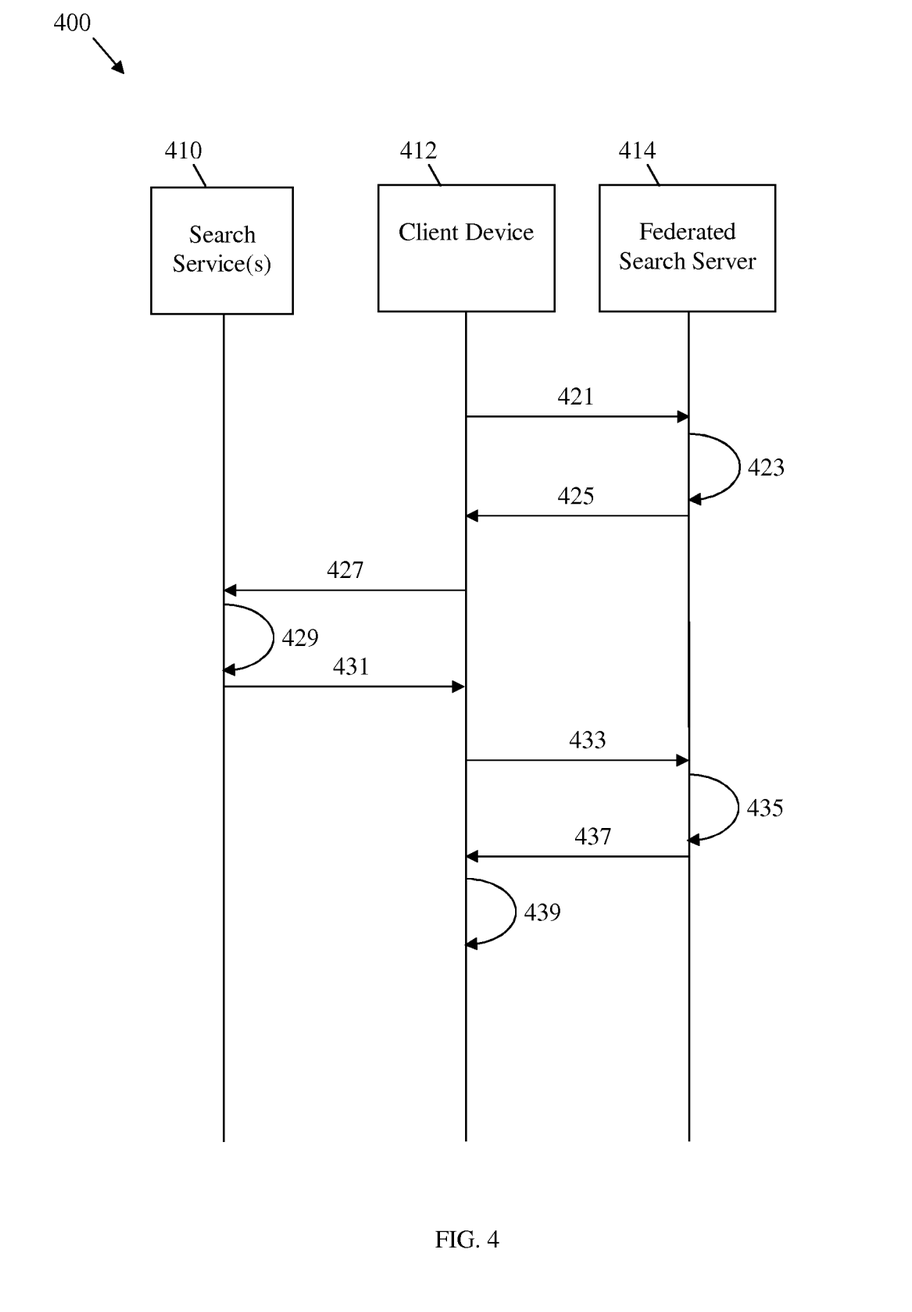
FIG. 4 is a protocol diagram of an embodiment of a hybrid federated search sequence.

FIG. 4 illustrates an embodiment of a hybrid federated search sequence 400 that may be implemented using a client device similar to the client device 400. The hybrid federated search sequence 400 may be implemented using a client device 412, a federated search server 414, and one or more first search services 410. For instance, the client device 412 may be similar to the client device 110, the federated search server 414 may be similar to the federated search server 120, and the first search services 410 may be similar to the first search services 130.

The hybrid federated search sequence 400 may begin at step 421, where the client device 412 may send a search query to the federated search server 414, e.g., in response to a user input. At step 423, the federated search server 414 may generate search instructions for the search services 410. The search instructions may be based on stored pre-customized configuration and metadata at the federated search server 414 and may comprise executable program codes and profile information of search service(s) that are generated according to the search query from the client device 412. At step 425, the federated search server 414 may send the search instructions to the client device 412. The search instructions may comprise executable program codes to initiate search on the search services 410 and to return search results received from the search services 410 to the federated search server 414.

At step 427, the client device 412 may use the search instructions to query the search services 410. The client device 412 may process the search instructions received from the federated search server 414 without receiving additional user input at the client device. In the case of multiple search services 410, the client device 412 may process the search instructions to query the search services 410 at about the same time or in sequence, e.g., based on pre-customized configuration and metadata stored in the federated search server 414. At step 429, the search services 410 may perform searches based on the received search queries from the client device 412. At step 431, the search services 410 may return the search results to the client device 412.

At step 433, client device 412 may forward the search results from the search services 410 to the federated search server 414. In an embodiment, the client device 412 may compress the search results before forwarding the search results to the federated search server 414, e.g., to decrease the size of forwarded data. The client device 412 may forward the search results in the original format received from the search services 410 or may format the search results before forwarding, e.g., in JavaScript Object Notation (JSON) format, Extensible Markup Language (XML) format, or other formats. The client device 412 may process the search results before forwarding based on the search instructions received from the federated search server 414. At step 435, the federated search server 414 may consolidate the search results received from search services 410. At step 435, the federated search server 414 may return the consolidated search result to the client device 412. At step 439, the client device 412 may display the received consolidated search result to the user of the client device 412.

During any point in the sequence, the federated search server 414 may generate notifications and send to the client device 412 notification messages, the client device 412 can react on the notification by displaying updated status, terminating a process, playing a sound or conducting other activity or their combinations. For example, at step 423, a series of notification messages indicating "one search engine is ready", "ten search engines are ready" and so on can be generated by the Search Instruction Generator 356 of the federated search server 414 and send to client device 412 for the search module 210 to instruct the client device to update its user interface. For another example, at step 435, the progress notification of consolidation generated by the Search Result Consolidator 360 of the federated search server 414 can be sent as notification messages to the client device 412. Such notification will allow the client device to take proper actions. Possible actions may include but not limit to: continuing waiting, abandoning transaction, playing comforting music, updating the progress status at interface, showing video, and so on.

Figure 5:
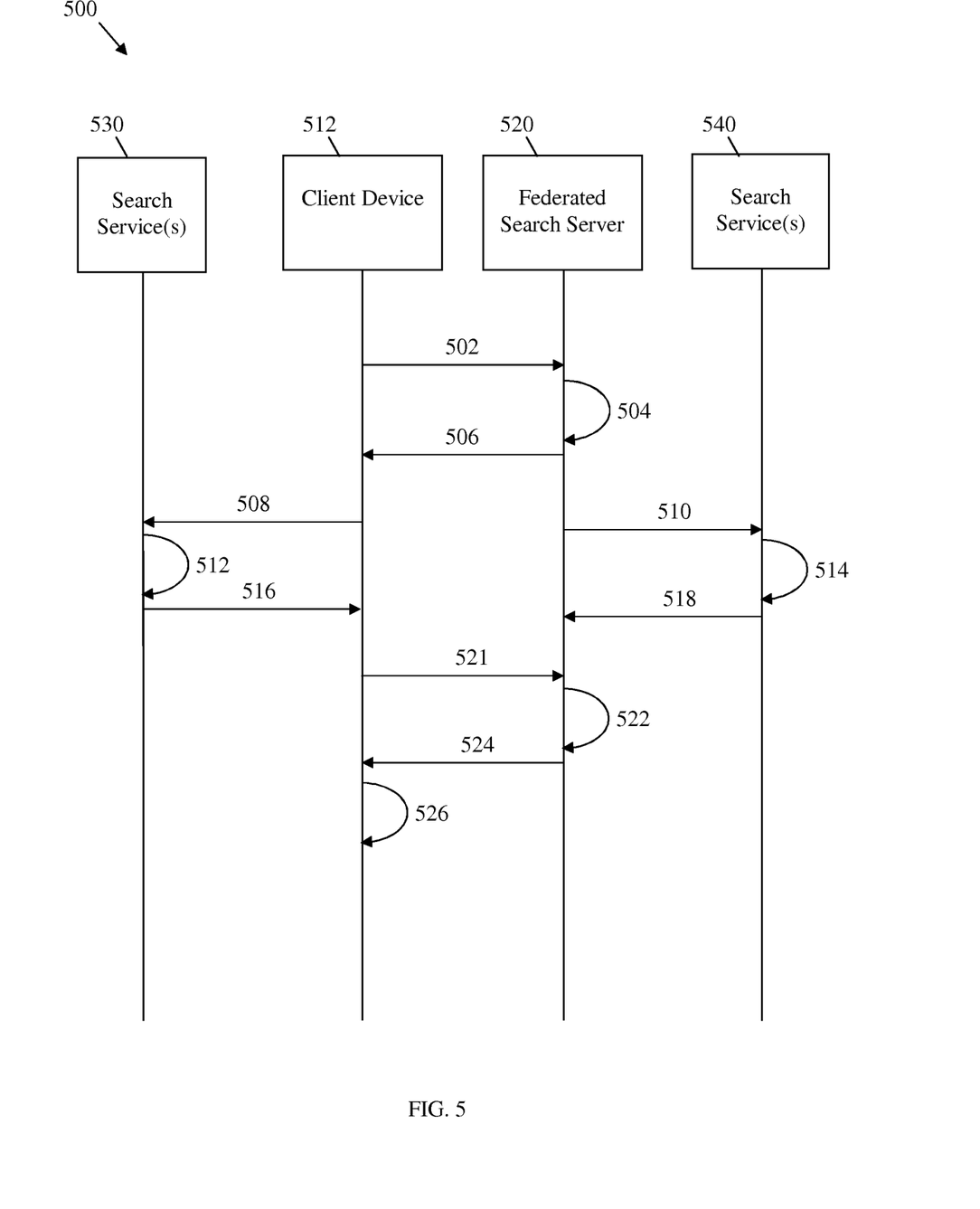
FIG. 5 is a protocol diagram of another embodiment of a hybrid federated search sequence.

FIG. 5 illustrates an embodiment of a hybrid federated search sequence 500 that may be implemented using a client device similar to the client device 300. The hybrid federated search sequence 500 may be implemented using a client device 512, a federated search server 520, one or more first search services 530, and one or more search services 540. For instance, the client device 512 may be similar to the client device 110, the federated search server 520 may be similar to the federated search server 120, the first search services 530 may be similar to the first search services 130, and the second search services 540 may be similar to the second search services 140.

The hybrid federated search sequence 500 may begin at step 502, where the client device 512 may send a search query to the federated search server 520, e.g., in response to a user input. At step 504, the federated search server 520 may generate search instructions for the first search services 530. The search instructions may be based on stored pre-customized configuration and metadata at the federated search server 520 and may comprise executable program codes that are generated according to the search query from the client device 512. At step 506, the federated search server 520 may send the search instructions to the client device 512. The search instructions may comprise executable program codes to initiate search on the first search services 530 and to return search results received from the first search services 530 to the federated search server 520.

At step 508, the client device 512 may use the search instructions to query the search services 530. The client device 512 may process the search instructions received from the federated search server 520 without receiving additional user input at the client device. In the case of multiple first search services 530, the client device 512 may process the search instructions to query the search services 530 at about the same time or in sequence, e.g., based on pre-customized configuration and metadata stored in the federated search server 520. At step 512, the search services 530 may perform searches based on the received search queries from the client device 512. At step 516, the first search services 530 may return the search results to the client device 512.

At step 510, the federated search server 520 may send search queries to the search services 540. The federated search server 520 may transform the content and format of the search queries appropriately to match the parameter requirements of each search services 540. At step 514, the search services 540 may perform searches based on the received search queries from the federated search server 520. At step 518, the search services 540 may return the search results to the federated search server 520. The steps 510, 514, and 518 may be implemented at about the same time as the steps 508, 512, and 516.

At step 521, the client device 512 may forward the search results from the search services 530 to the federated search server 520. In an embodiment, the client device 512 may compress the search results before forwarding the search results to the federated search server 520, e.g., to decrease the size of forwarded data. The client device 512 may forward the search results in the original format received from the search services 530 or may format the search results before forwarding, e.g., in JavaScript Object Notation (JSON) format, Extensible Markup Language (XML) format, or other formats. The client device 512 may process the search results before forwarding based on the search instructions received from the federated search server 520. At step 522, the federated search server 520 may consolidate the search results received from both the search services 530 and the search services 540. At step 524, the federated search server 520 may return the consolidated search result to the client device 512. At step 526, the client device 512 may display the received consolidated search result to the user of the client device.

Figure 6:
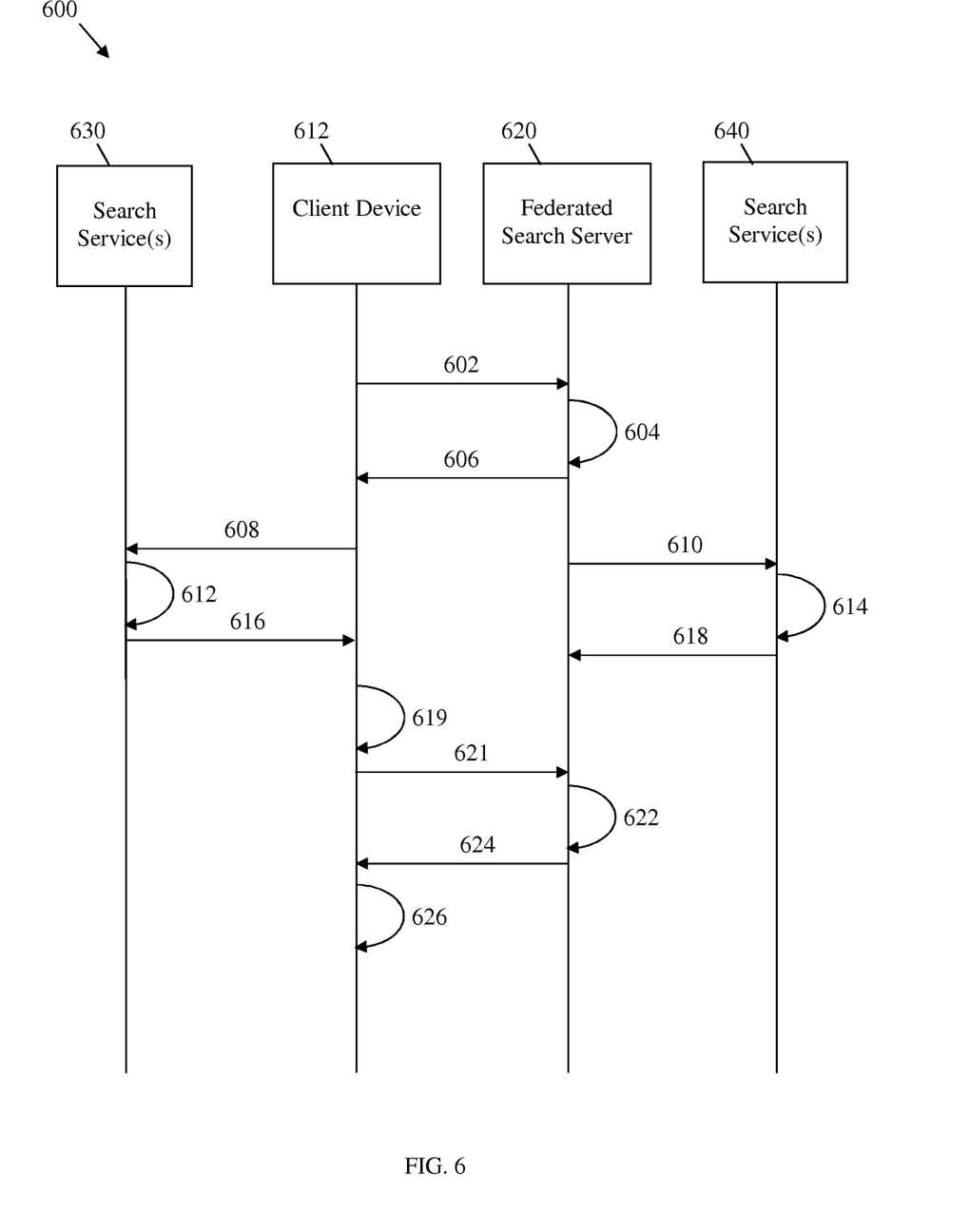
FIG. 6 is a protocol diagram of another embodiment of a hybrid federated search sequence.

FIG. 6 illustrates an embodiment of another hybrid federated search sequence 600 that may be implemented using a client device similar to the client device 110. The hybrid federated search sequence 600 may be implemented using a client device 612, a federated search server 620, one or more first search services 630, and one or more search services 640. The federated search server 620 may be similar to the federated search server 120, the search services 630 may comprise one or more search services similar to the first search services 130 and one or more search services similar to the second search services 140. The hybrid federated search sequence 600 may comprise a plurality of steps 602, 604, 606, 608, 610, 612, 614, 616, 618, 621, 622, 624, and 626 substantially similar to the steps 502, 504, 506, 508, 510, 512, 514, 516, 518, 521, 522, 524, and 526 of the hybrid federated search sequence 500, respectively.

The hybrid federated search sequence 600 may also comprise an additional step 619 after step 616 and before step 622. At step 619, the client device 612 may process the search results received from the search services 630 (step 616) before forwarding the search results to the federated search server 620 (step 621). Processing the search results may comprise aggregating the search results before sending the search results to the federated search server 620. Processing the search results may also comprise performing redundancy check and removing any repeated search results by different search services 630, which may decrease the size of data sent to the federated search server 620. Processing the search results may also comprise other functions, including sorting the search results based on a determined order (e.g., relevance or date), filtering the search results based on some criteria (e.g., as indicated by user), and/or classifying or clustering the search results properly.

Figure 7:
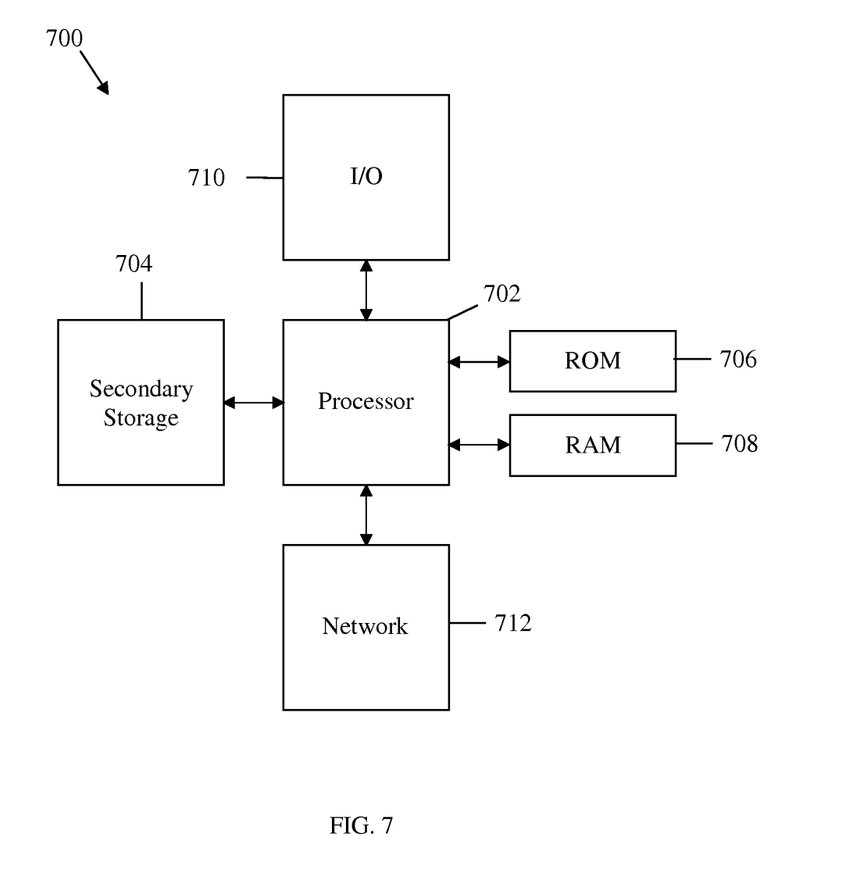
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs) and/or digital signal processors (DSPs).

The secondary storage 704 is typically comprised of one or more disk drives or erasable programmable ROM (EPROM) and is used for non-volatile storage of data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A client device comprising:
a search module, wherein the search module configured to:
send, via a transmitter, a master search query from a first network to a federated search server located in a second network, wherein the first network and the second network are separated such that the federated search server cannot perform searching on the first network;
receive, via a receiver, search instructions from the federated search server, wherein the search instructions comprise executable program codes and profile information suitable for any search service to conduct a search according to the master search query;
send, via the transmitter, a query to a first search service located in the first network, wherein the query uses the search instructions;
receive, via the receiver, a first search result from the first search service in response to the query;
send, via the transmitter, the first search result to the federated search server; and
receive, via the receiver, a second search result from the federated search server, wherein the second search result was produced by the federated search server querying a second search service located in the second network.

2. The client device of claim 1, wherein the master search query does not comprise any executable program codes and profile information.

3. The client device of claim 1, wherein the second search result is received in a consolidated search result that comprises the first search result and the second search result.

4. The client device of claim 1, wherein the profile information describes a connection, an interface, and a result wrapper.

5. The client device of claim 1, wherein the search module is further configured to combine, via a processor, the first search result with another search result received from another search service in the first network to produce a combined search result before sending the first search result to the federated search server, and wherein sending the first search result to the federated search server comprises: sending the combined search result to the federated search server.

6. The client device of claim 5, wherein combining the first search result comprises:
 ordering the first search result and the other search result within the combined search result;
 performing a redundancy check for the combined search result;
 removing any duplicate search results from the combined search result;
 filtering the combined search result based on a criteria; and
 classifying or clustering the combined search result.

7. The client device of claim 1, wherein the query comprises data to overcome an access restriction at the search service, and wherein the data comprises information concerning a user subscription.

8. The client device of claim 1, wherein the first network is a private local area network (LAN), and wherein the second network is a public wide area network (WAN).

9. A computer program product comprising computer executable instructions stored on a non-transitory medium that when executed by a processor cause the processor to perform the following:
 receive a master search query from a client device located in a first network, wherein the first network and a second network are separated such that a federated search server located in the second network cannot perform searching on the first network;
 send search instructions to the client device, wherein the search instructions comprise executable program codes and profile information suitable for any search service to conduct a search according to the master search query, wherein the client device is configured to obtain a first search result from a first search service located in the first network using the search instructions, and wherein the first search service cannot communicate with the processor;
 query a second search service located in the second network using the search instructions;
 receive a second search result from the second search service in response to the query;
 receive the first search result from the client device; and
 send the second search result to the client device.

10. The computer program product of claim 9, wherein the master search query does not comprise any executable program codes and profile information.

11. The computer program product of claim 9, wherein the second search result is sent in a consolidated search result that comprises the first search result and the second search result.

12. The computer program product of claim 9, wherein the profile information describes a connection, an interface, and a result wrapper.

13. The computer program product of claim 9, wherein the instructions further cause the processor to combine the second search result with another search result received from another search service in the second network to produce a combined search result before sending the second search result to the client device and wherein sending the second search result to the client device comprises sending the combined search result to the client device.

14. The computer program product of claim 13, wherein combining the second search result comprises:
 ordering the second search result and the other search result within the combined search result;
 performing a redundancy check for the combined search result;
 removing any duplicate search results from the combined search result;
 filtering the combined search result based on a criteria; and
 classifying or clustering the combined search result.

15. The computer program product of claim 9, wherein the processor is configured to access the second search service using a user subscription, a credential data, or an account.

16. The computer program product of claim 9, wherein the first network is a private local area network (LAN), and wherein the second network is a public wide area network (WAN).

17. In a client device, a method for performing distributed searching comprising:
 sending a master search query from a first network to a federated search server located in a second network, wherein the first network and the second network are separated such that the federated search server cannot perform searching on the first network;
 receiving search instructions from the federated search server, wherein the search instructions comprise executable program codes and profile information suitable for any search service to conduct a search according to the master search query;
 querying a first search service located in the first network using the search instructions;
 receiving a first search result from the first search service in response to the query;
 sending the first search result to the federated search server; and
 receiving a second search result from the federated search server, wherein the second search result was produced by the federated search server querying a second search service located in the second network.

18. The method of claim 17, wherein the master search query does not comprise any executable program codes and profile information.

19. The method of claim 18, wherein the second search result is received in a consolidated search result that comprises the first search result and the second search result.

20. The method of claim 19, wherein the profile information describes a connection, an interface, and a result wrapper.

21. The method of claim 19, further comprising combining the first search result with another search result received from another search service in the first network to produce a combined search result before sending the first search result to the federated search server, wherein sending the first search result to the federated search server comprises sending the combined search result to the federated search server.

22. The method of claim 21, wherein combining the first search result comprises:
 ordering the first search result and the other search result within the combined search result;
 performing a redundancy check for the combined search result;
 removing any duplicate search results from the combined search result;
 filtering the combined search result based on a criteria; and
 classifying or clustering the combined search result.

23. The method of claim 22, wherein the first search service is accessed using a user subscription, a credential data, or an account.

24. The method of claim 23, wherein the first network is a private local area network (LAN), and wherein the second network is a public wide area network (WAN).

25. A method implemented on a hardware processor, the method comprising:
  receiving a master search query from a client device located in a first network, wherein the first network and the second network are separated such that a federated search server located in the second network cannot perform searching on the first network;
  sending search instructions to a client device, wherein the search instructions comprise executable program codes and profile information suitable for any search service to conduct a search according to the master search query, wherein the client device is configured to obtain a first search result from a first search service located in the first network using the search instructions, and wherein the first search service cannot communicate with the processor; and
  querying a second search service located in the second network using the search instructions;
  receiving a second search result from the second search service in response to the query;
  receiving the first search result from the client device; and
  sending the second search result to the client device.

26. The method of claim 25, wherein the master search query does not comprise any executable program codes and profile information.

27. The method of claim 26, wherein the second search result is sent in a consolidated search result that comprises the first search result and the second search result.

28. The method of claim 27, wherein the profile information describes a connection, an interface, and a result wrapper.

29. The method of claim 27, wherein the instructions further cause the processor to combine the second search result with another search result received from another search service in the second network to produce a combined search result before sending the second search result to the client device, and wherein sending the second search result to the client device comprises sending the combined search result to the client device.

30. The method of claim 29, wherein combining the second search result comprises:
  ordering the second search result and the other search result within the combined search result;
  performing a redundancy check for the combined search result;
  removing any duplicate search results from the combined search result;
  filtering the combined search result based on a criteria; and
  classifying or clustering the combined search result.

31. The method of claim 30, wherein the second search service is accessed using a user subscription, a credential data, or an account.

32. The method of claim 31, wherein the first network is a private local area network (LAN), and wherein the second network is a public wide area network (WAN).

* * * * *

UNITED STATES PATENT AND TRADEMARK OFFICE
CERTIFICATE OF CORRECTION

PATENT NO. : 8,706,756 B2
APPLICATION NO. : 13/105314
DATED : April 22, 2014
INVENTOR(S) : Zhiguo Wu et al.

It is certified that error appears in the above-identified patent and that said Letters Patent is hereby corrected as shown below:

In the claims:

Column 10, lines 66-67, through Column 11, lines 1-6, printed Claim 5 should read as:
"5. The client device of claim 1, wherein the search module is further configured to combine, via a processor, the first search result with another search result received from another search service in the first network to produce a combined search result before sending the first search result to the federated search server, and wherein sending the first search result to the federated search server comprises sending the combined search result to the federated search server."

Signed and Sealed this
First Day of July, 2014

Michelle K. Lee
*Deputy Director of the United States Patent and Trademark Office*